United States Patent
Rice et al.

(10) Patent No.: US 6,564,555 B2
(45) Date of Patent: May 20, 2003

(54) APPARATUS FOR FORMING A COMBUSTION MIXTURE IN A GAS TURBINE ENGINE

(75) Inventors: Edward C. Rice, Indianapolis, IN (US); Brian P. King, Greenwood, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 25 days.

(21) Appl. No.: 09/864,716

(22) Filed: May 24, 2001

(65) Prior Publication Data

US 2002/0174657 A1 Nov. 28, 2002

(51) Int. Cl.[7] .............................. F02C 1/00; F02G 3/00
(52) U.S. Cl. ........................................ 60/746; 60/740
(58) Field of Search .......................... 60/751, 746, 739, 60/738, 740

(56) References Cited

U.S. PATENT DOCUMENTS

| | | | |
|---|---|---|---|
| 3,581,492 A | 6/1971 | Norgren et al. | 60/39.36 |
| 3,714,778 A | 2/1973 | Howald | 60/39.74 R |
| 3,724,207 A | 4/1973 | Johnson | 60/39.74 R |
| 3,899,884 A * | 8/1975 | Ekstedt | 431/183 |
| 4,145,880 A | 3/1979 | Markowski | 60/261 |
| 4,170,108 A | 10/1979 | Mobsby | 60/39.74 R |
| 4,177,637 A | 12/1979 | Pask | 60/39.36 |
| 4,180,972 A | 1/1980 | Herman et al. | 60/39.32 |
| 4,199,935 A | 4/1980 | Hakluytt | 60/734 |
| 4,314,443 A | 2/1982 | Barbeau | 60/39.36 |
| 4,416,111 A * | 11/1983 | Lenahan et al. | 415/115 |
| 4,446,692 A | 5/1984 | Adkins | 60/39.23 |
| 4,693,704 A | 9/1987 | Ogita | 604/55 |
| 4,898,001 A | 2/1990 | Kuroda et al. | 60/733 |
| 4,918,926 A | 4/1990 | Nikkanen | 60/751 |
| 4,971,768 A | 11/1990 | Ealba et al. | 422/176 |
| 4,996,837 A | 3/1991 | Shekleton | 60/39.36 |
| 5,077,967 A * | 1/1992 | Widener et al. | 415/208.1 |
| 5,187,937 A | 2/1993 | Stevens et al. | 60/752 |
| 5,211,003 A * | 5/1993 | Samuel | 60/751 |
| 5,279,126 A * | 1/1994 | Holladay | 60/751 |
| 5,311,743 A * | 5/1994 | Ansart et al. | 60/747 |
| 5,335,501 A * | 8/1994 | Taylor | 60/747 |
| 5,339,622 A * | 8/1994 | Bardey et al. | 415/169.2 |
| 5,592,820 A | 1/1997 | Alary et al. | 60/751 |
| 5,592,821 A * | 1/1997 | Alary et al. | 415/208.1 |
| 5,619,855 A * | 4/1997 | Burrus | 60/262 |
| 5,626,017 A | 5/1997 | Sattelmayer | 60/723 |
| 5,839,283 A | 11/1998 | Döbbeling | 60/737 |
| 5,946,904 A | 9/1999 | Boehnlein et al. | 60/269 |
| 6,286,298 B1 * | 9/2001 | Burrus et al. | 60/732 |
| 6,295,801 B1 * | 10/2001 | Burrus et al. | 60/737 |
| 6,334,297 B1 * | 1/2002 | Dailey et al. | 60/751 |

* cited by examiner

*Primary Examiner*—Charles G. Freay
*Assistant Examiner*—William H. Rodriguez
(74) *Attorney, Agent, or Firm*—Woodard, Emhardt, Moriarty, McNett & Henry LLP

(57) ABSTRACT

The present invention contemplates an apparatus for forming a combustion mixture in a gas turbine engine. In one form, the apparatus includes a diffuser having at least two flowpath structures spaced apart to define a flowpath for directing fluid flow. At least one of the flowpath structures includes a flowpath surface and a plurality of edges disposed along a trailing end portion of the flowpath surface. The edges extend perpendicularly from the flowpath surface and are arranged generally parallel to the fluid flow to define a plurality of corners. A fluid vortex is generated as the fluid flow rolls over each of the corners. A spray ring is disposed along a trailing edge of one of the flowpath structures and is integrally attached to the diffuser. The spray ring includes a plurality of fuel delivery apertures adapted to spray fuel into respective ones of the fluid vortices to form the combustion mixture.

35 Claims, 6 Drawing Sheets

APPARATUS FOR FORMING A COMBUSTION MIXTURE IN A GAS TURBINE ENGINE

This invention was made with U.S. Government support under contract F33615-94C-2482 awarded by the United States Air Force, and the U.S. Government may have certain rights in the invention.

BACKGROUND OF THE INVENTION

The present invention relates generally to gas turbine engines. More particularly, the present invention relates to an apparatus for forming a combustion mixture in a gas turbine engine. A gas turbine engine is typical of the type of turbo machinery in which the present invention may be advantageously employed; however, certain applications of the invention may fall outside of this field.

It is well known that a conventional gas turbine engine includes a compressor for compressing a fluid, such as, for example, air, to an increased pressure. The increased pressure fluid is passed through a diffuser to condition the increased pressure fluid for subsequent combustion. The conditioned fluid is fed into a combustion chamber, typically defined by a combustor dome panel and inner and outer combustor liners. A series of fuel nozzles are usually provided, extending through the outer combustor case and positioned within corresponding openings arranged circumferentially about the combustor dome panel. The fuel nozzles are configured to deliver fuel into the combustion chamber, and in some designs function to pre-swirl the conditioned fluid entering the combustion chamber to create a helical flowpath which enhances the intermixing of the fuel with the conditioned fluid to create a combustion mixture.

The combustion mixture is ignited and burned in the combustion chamber to generate a high temperature gaseous flow stream. The gaseous flow stream is discharged from the combustion chamber into a turbine section where the gaseous flow stream is directed by a series of turbine vanes through a series of turbine blades. The turbine blades convert the thermal energy from the gaseous flow stream into rotational kinetic energy, which in turn is utilized to develop shaft power to drive mechanical components, such as the compressor, fan, propeller or other such devices. Alternatively, the high temperature gaseous flow stream may be used directly as a thrust for providing motive force, such as in a turbine jet engine.

Heretofore, there has been a need for an improved apparatus for forming a combustion mixture in a gas turbine engine. The present invention satisfies this need in a novel and unobvious way.

SUMMARY OF THE INVENTION

One form of the present invention contemplates an apparatus for forming a combustion mixture in a gas turbine engine, comprising: a diffuser including first and second flowpath surfaces spaced apart to define a flowpath for directing fluid flow, at least one of the first and second flowpath surfaces includes a surface irregularity adapted to generate a vortex upon the fluid flow passing thereover; and a fuel delivery member adapted to introduce fuel into the fluid flow adjacent the vortex to form the combustion mixture.

Another form of the present invention contemplates an apparatus for forming a combustion mixture in a gas turbine engine, comprising: a diffuser including first and second flowpath structures spaced apart to define a first flowpath for directing fluid flow; and a first fuel spraybar disposed along a trailing edge of one of the first and second flowpath structures and adapted to spray fuel into the fluid flow exiting the first flowpath to form the combustion mixture.

Yet another form of the present invention contemplates an apparatus for forming a combustion mixture in a gas turbine engine, comprising: a diffuser including first and second structures spaced apart to define a flowpath for directing fluid flow, at least one of the first and second structures including a flowpath surface having an edge extending from the flowpath surface and arranged generally parallel to the fluid flow, wherein a vortex is generated as the fluid flow rolls over the edge; and a spraybar disposed along a trailing edge of the at least one of the first and second structures, the spraybar adapted to spray fuel into the vortex to form the combustion mixture.

In another form of the present invention there is contemplates an apparatus for forming a combustion mixture in a gas turbine engine, comprising: a diffuser including first and second flowpath surfaces spaced apart to define a flowpath for directing fluid flow, at least one of the first and second flowpath surfaces including surface means for generating a vortex in the fluid flow; and means for introducing fuel into the fluid flow adjacent the vortex to form the combustion mixture.

In another form of the present invention there is contemplated a method of controlling combustion in a gas turbine engine, comprising: providing first and second flowpaths within a diffuser for directing fluid flow; introducing a first quantity of fuel into the fluid flow of the first flowpath to form a first portion of a combustion mixture; introducing a second quantity of fuel into the fluid flow of the second flowpath to form a second portion of the combustion mixture; igniting the first portion of the combustion mixture to form a first combustion zone; igniting the second portion of the combustion mixture to form a second combustion zone; and independently controlling the introduction of the first and second quantities of fuel to provide independent control over the first and second combustion zones.

One object of the present invention is to provide a unique apparatus for forming a combustion mixture in a gas turbine engine.

Further forms, embodiments, objects, features, advantages, benefits, and aspects of the present invention will become apparent from the drawings and descriptions provided herein.

DESCRIPTION OF THE PREFERRED EMBODIMENTS

Figure 1:
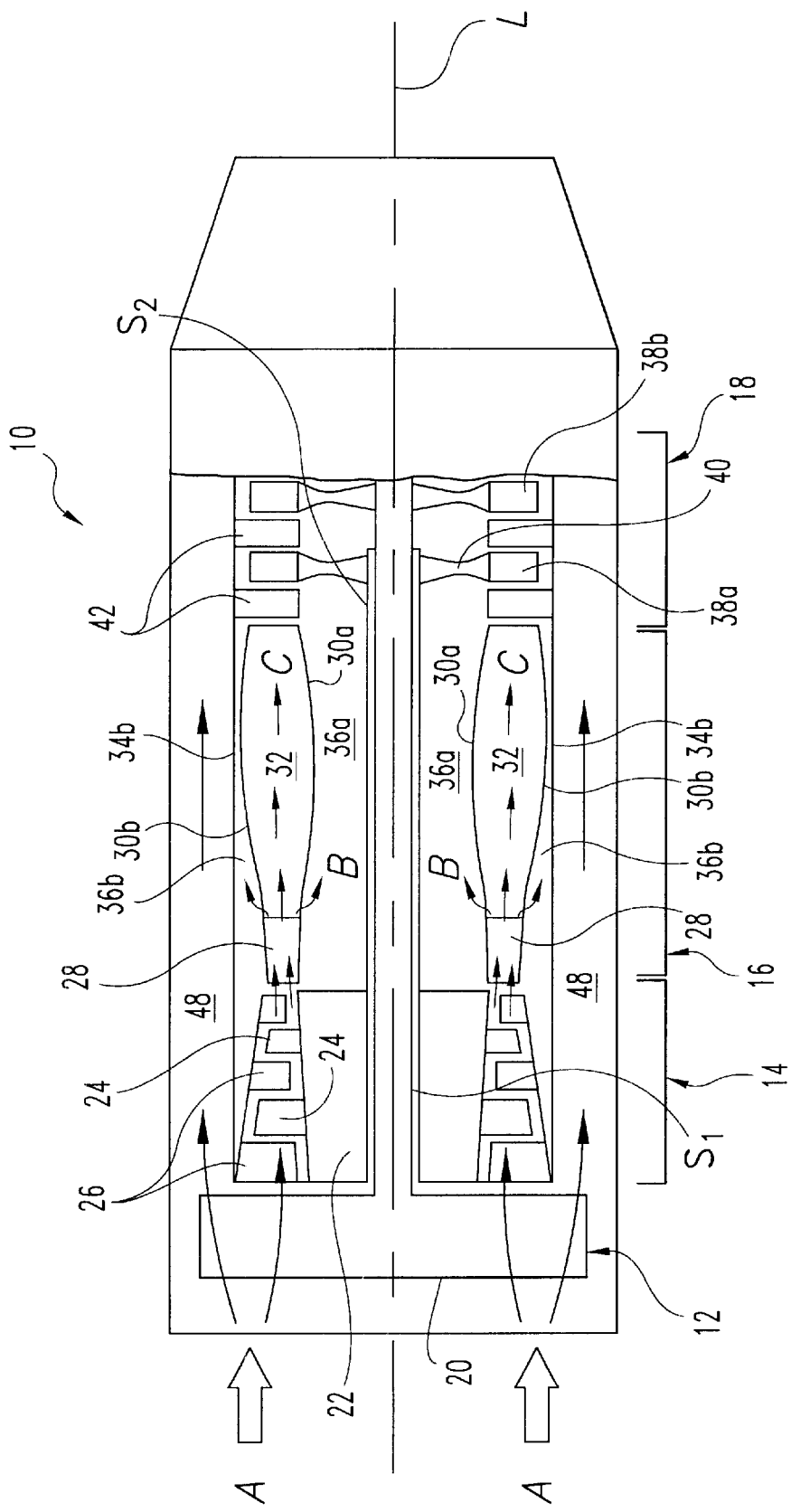
FIG. 1 is a schematic representation of a gas turbine engine.

For the purposes of promoting an understanding of the principals of the present invention, reference will now be made to the embodiments illustrated in the drawings and specific language will be used to describe the same. It will nevertheless be understood that no limitation of the scope of the present invention is hereby intended, and any alterations and further modifications of the illustrated device, and any further applications of the principals of the invention as illustrated herein being contemplated as would normally occur to one skilled in the art to which the invention relates.

With reference to FIG. 1, there is illustrated a schematic representation of a gas turbine engine 10. However, it should be understood that the invention described herein is applicable to all types of gas turbine engines, and is not intended to be limited to the gas turbine engine schematic represented in FIG. 1. The gas turbine engine 10 includes a longitudinal axis L extending generally along the working fluid flow path. Gas turbine engine 10 includes a fan section 12, a compressor section 14, a combustor section 16 and a turbine section 18 integrated to produce an aircraft flight propulsion engine generally referred to as a turbo-fan. Another form of a gas turbine engine includes a compressor section, a combustor section, and a turbine section integrated to produce an aircraft flight propulsion engine without a fan section.

It should be understood that the term "aircraft" is generic and is meant to include helicopters, airplanes, missiles, unmanned space devices, transatmospheric vehicles and other substantially similar devices. It is also important to realize that there are a multitude of ways in which the gas turbine engine components can be linked together to produce a flight propulsion engine. For instance, additional compressor and turbine stages could be added with intercoolers connected between the compressor stages. Additionally, although gas turbine engine 10 has been described for use with an aircraft, it should understood that engine 10 is equally suited to be used in industrial applications, such as, for example, pumping sets for gas and oil transmission lines, electricity generation, and naval propulsion. Further, a gas turbine engine has application in propelling motor vehicles.

The fan section 12 includes a fan 20 having a plurality of fan blades. A gaseous fluid is passed through fan 20 and fed into the compressor section 14. In one form of the present invention, the gaseous fluid is air. The multi-stage compressor section 14 includes a rotor 22 having a plurality of compressor blades 24 coupled thereto. The rotor 22 is affixed to a shaft $S_1$ which is rotatably mounted within gas turbine engine 10. A plurality of compressor vanes 26 are positioned adjacent the compressor blades 24 to direct the flow of the gaseous fluid through the compressor section 14.

Increased pressure fluid from the compressor section 14 is fed into the combustor section 16. In one form of the present invention, combustor section 16 includes a diffuser 28 and inner and outer combustor liners 30a, 30b coupled to diffuser 28 and spaced apart to define a combustion chamber 32. In one form of the invention, the liners 30a, 30b are spaced radially apart to define an annular combustor chamber; however, other combustor chamber configurations are also contemplated herein. Inner combustor liner 30a is spaced from an inner combustion case wall member 34a (FIG. 2) to define a fluid flow passage 36a. The outer combustor liner 30b is spaced from an outer combustion case wall member 34b to define a fluid flow passage 36b.

Turbine section 18 includes a plurality of turbine blades 38a coupled to a rotor 40a, which in turn is affixed to a drive shaft $S_2$ for transmitting rotational power to the compressor section 14. Turbine section 18 also includes a plurality of turbine blades 38b coupled to a rotor 40b, which in turn is affixed to shaft $S_1$ for transmitting rotational power to the fan section 12. A plurality of turbine vanes 42 are positioned adjacent the turbine blades 38a, 38b to direct the flow of the hot gaseous fluid stream generated by combustor section 16 through turbine section 18.

In operation, the turbine section 18 provides rotational power to shafts $S_1$ and $S_2$, which in turn drive the fan section 12 and the compressor section 14, respectively. A fluid such as, for example, air, enters the gas turbine engine 10 in the direction of arrows A, passes through fan section 12, and is fed into the compressor section 14 and a bypass duct 48. A substantial portion of the increased pressure air exiting compressor section 14 is routed into the diffuser 28. The diffuser 28 conditions the compressed air and directs portions of the conditioned air into the combustion chamber 32 and the annular fluid passages 36a, 36b in the direction of arrows B. The conditioned air entering the combustion chamber 32 is intermixed with fuel to provide a combustion mixture. The combustion mixture is ignited and burned in combustion chamber 32 to generate the hot gaseous fluid stream.

The hot gaseous fluid stream flows through the combustion chamber 32 in the direction of arrows C. The fluid stream exits the aft end of the combustion chamber 32 where it is fed into the turbine section 18 to extract the energy necessary to power gas turbine engine 10. Further details regarding the general structure and operation of a gas turbine engine 10 are believed known to those skilled in the art and are therefore deemed unnecessary for a full understanding of the principles of the present invention.

Figure 2:
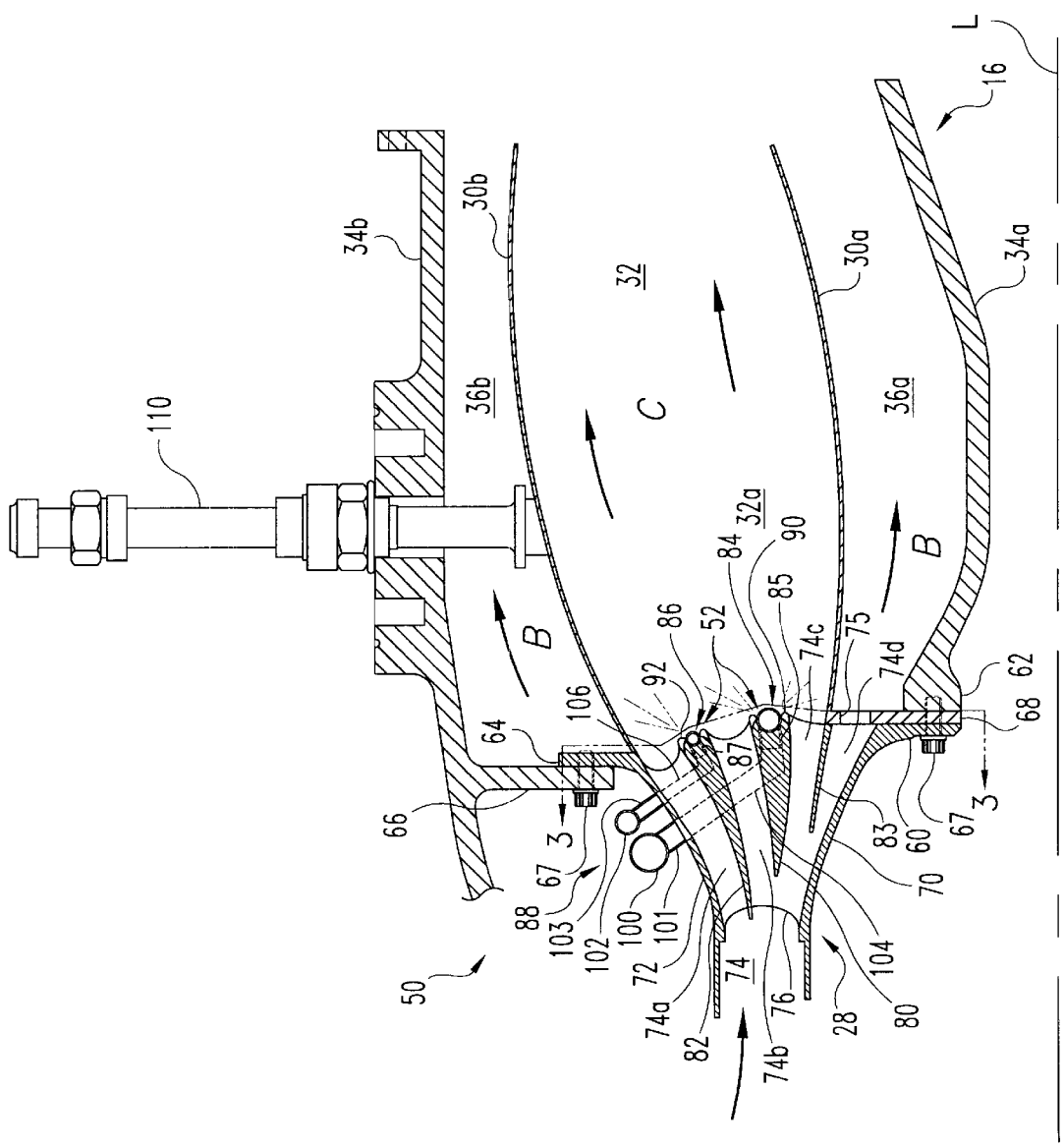
FIG. 2 is a sectional view of a portion of a gas turbine engine, illustrating an apparatus for forming a combustion mixture therein according to one form of the present invention.

Referring to FIG. 2, there is illustrated a cross sectional view of a portion of a gas turbine engine including a combustor system 50 comprising one form of the present invention. Combustor system 50 is generally comprised of diffuser 28, inner and outer combustor liners 30a, 30b and a fuel delivery system 52. As will be discussed in greater detail below, in one embodiment of combustor system 50, the diffuser 28 and the fuel delivery system 52 define an integral unit. By integrating diffuser 28 and fuel delivery system 52, the combustor dome panel and the fuel nozzles extending therethrough may be eliminated. Additionally, the overall length of the combustor section 16 may be reduced.

In one form of the present invention, diffuser 28 is supported within gas turbine engine 10 by an inner diffuser flange 60 operably attached to an inner combustor case flange 62, and an outer diffuser flange 64 operably attached to an outer combustor case flange 66. In one embodiment, the inner and outer diffuser flanges 60, 64 are respectively attached to the inner and outer combustor case flanges 62, 66 by a plurality of fasteners 67. In one form of the present invention, the inner and outer combustion liners 30a, 30b are maintained in a spaced relation by the diffuser 28. In one embodiment, the inner combustion liner 30a includes an inwardly extending flange 68 captured between the inner diffuser flange 60 and the combustor case flange 62, and the outer combustion liner 30b is integrally attached to diffuser 28, such as, for example, by welding. It should be understood, however, that other mounting arrangements of liners 30a, 30b are also contemplated. For example, the inner combustor liner 30a could alternatively be integrally attached to diffuser 28, and/or the outer combustion liner 30b could alternatively include an outwardly extending flange captured between the outer diffuser flange 64 and combustor case flange 66.

Diffuser 28 generally comprises an inner flowpath wall 70 spaced from an outer flowpath wall 72 to define a flowpath 74 therebetween. A plurality of struts 76 interconnect the inner and outer flowpath walls 70, 72. In one embodiment, the inner and outer flowpath walls 70, 72 are radially spaced apart to define an annular flowpath. However, it should be understood that other configurations of diffuser 28 are also contemplated. As shown in the illustrated embodiment, the inner and outer flowpath walls 70, 72 diverge away from one another in the direction of fluid flow. The diverging flowpath allows increased pressure fluid from compressor section 14 to expand and decelerate to a lower velocity, thereby decreasing dynamic pressure and correspondingly increasing static pressure. In this manner, diffuser 28 conditions the fluid for subsequent combustion within combustion chamber 32.

In one form of diffuser 28, an inner splitter vane 80 and an outer splitter vane 82 are disposed within flowpath 74, each extending between adjacent struts 76 to define three separate flowpath passes 74a, 74b, 74c. In a further form of diffuser 28, a divider member 83 is disposed within flowpath pass 74c, extending between adjacent struts 76 to define a fourth flowpath pass 74d. Although diffuser 28 has been illustrated and described herein as having a specific configuration, it should be understood that other configurations of diffuser 28 are also contemplated. For example, instead of defining four flowpath passes 74a–74d, diffuser 28 could alternatively define any number of flowpath passes, including a single flowpath pass. Additionally, although diffuser 28 has been illustrated and described as having an annular shape, other shapes and configurations are also contemplated. The components of diffuser 28 may be formed of conventional materials as would be known to one of ordinary skill in the art; material such as, but not limited to, materials available under the tradenames Waspaloy and RS-5.

A significant portion of the increased pressure fluid from compressor section 14 is routed through flowpath passes 74a, 74b, 74c to condition the fluid for subsequent combustion within combustion chamber 32. A portion of the increased pressure fluid from compressor section 14 is directed through flowpath pass 74d and is fed through apertures 75 in flange 68 of inner combustor liner 30a and into inner fluid passage 36a to cool the inner combustion liner 30a and other engine components. A portion of the increased pressure fluid is also fed into the outer fluid passage 36b to cool the outer combustion liner 30b and other engine components. In one embodiment of diffuser 28, the outer flowpath wall 72 includes a number of passages (not shown) adapted to bleed a portion of the increased pressure fluid from flowpath pass 74a into outer passage 36b. However, other methods are also contemplated for feeding fluid into the inner and outer fluid passage 36a, 36b such as would occur to one of ordinary skill in the art.

In one form of the present invention, the fuel delivery system 52 is adapted to introduce fuel into combustion chamber 32 where the fuel is intermixed with the conditioned fluid from the diffuser 28 to form the combustion mixture. Fuel delivery system 52 is generally comprised of an inner spray ring 84, an outer spray ring 86 and a manifold system 88. In one embodiment of fuel delivery system 52, the inner spray ring 84 is coupled to a trailing edge 90 of the inner splitter vane 80, and is at least partially disposed within an annular groove or recess 91 (FIG. 4) formed about trailing edge 90. Similarly, the outer spray ring 86 is coupled to a trailing edge 92 of the outer splitter vane 82, and is at least partially disposed within an annular groove 93 (FIG. 4) formed about trailing edge 92. In another embodiment of fuel delivery system 52, spray rings 84, 86 are integrally attached to splitter vanes 80, 82, respectively, by any method known to one of ordinary skill in the art, such as, for example, by welding and/or brazing. However, other means of attachment are also contemplated as would occur to one of ordinary skill in the art.

Figure 3:
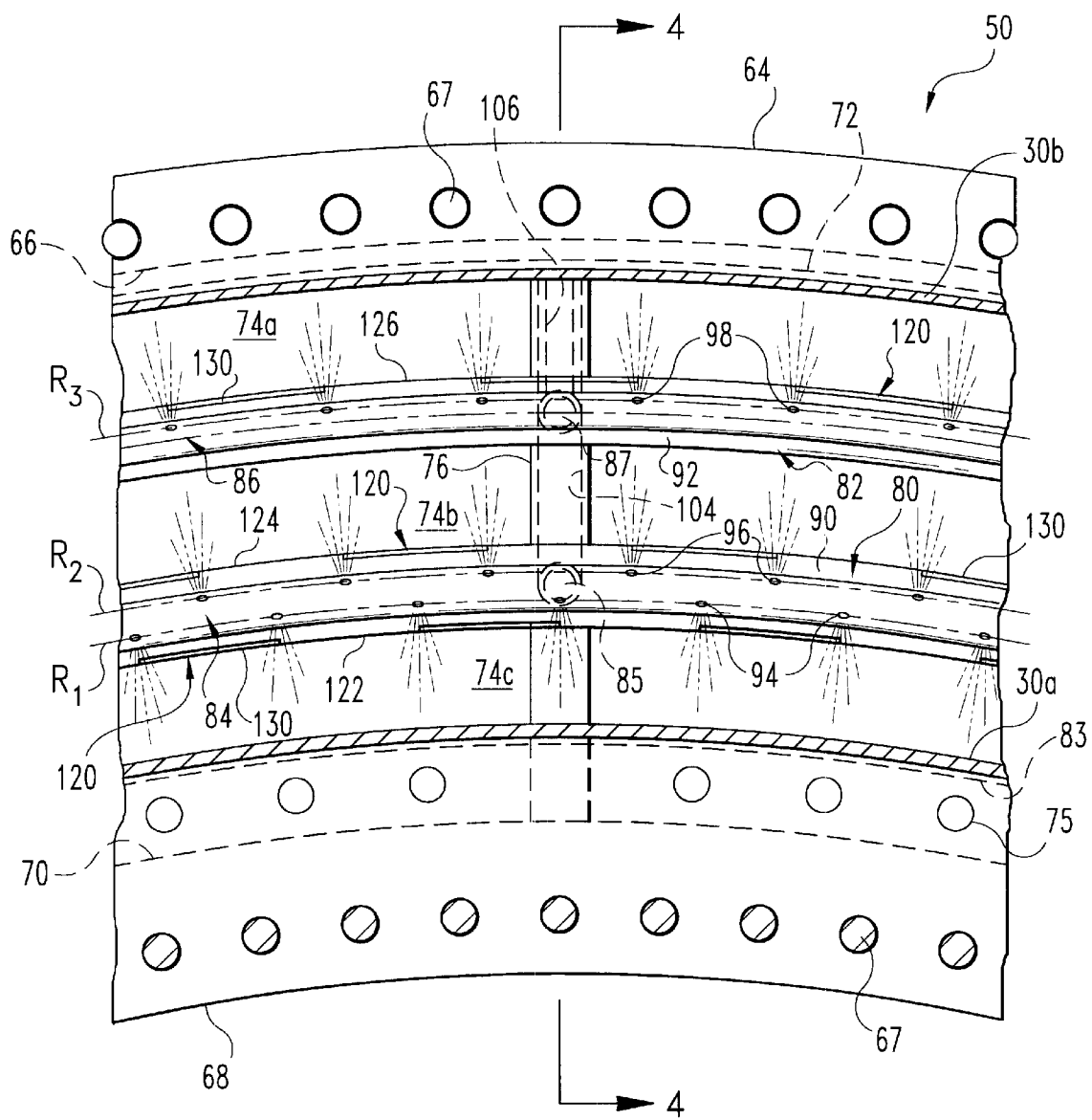
FIG. 3 is a cross-sectional view of the apparatus illustrated in FIG. 2, taken along line 3—3 of FIG. 2.
Figure 4:
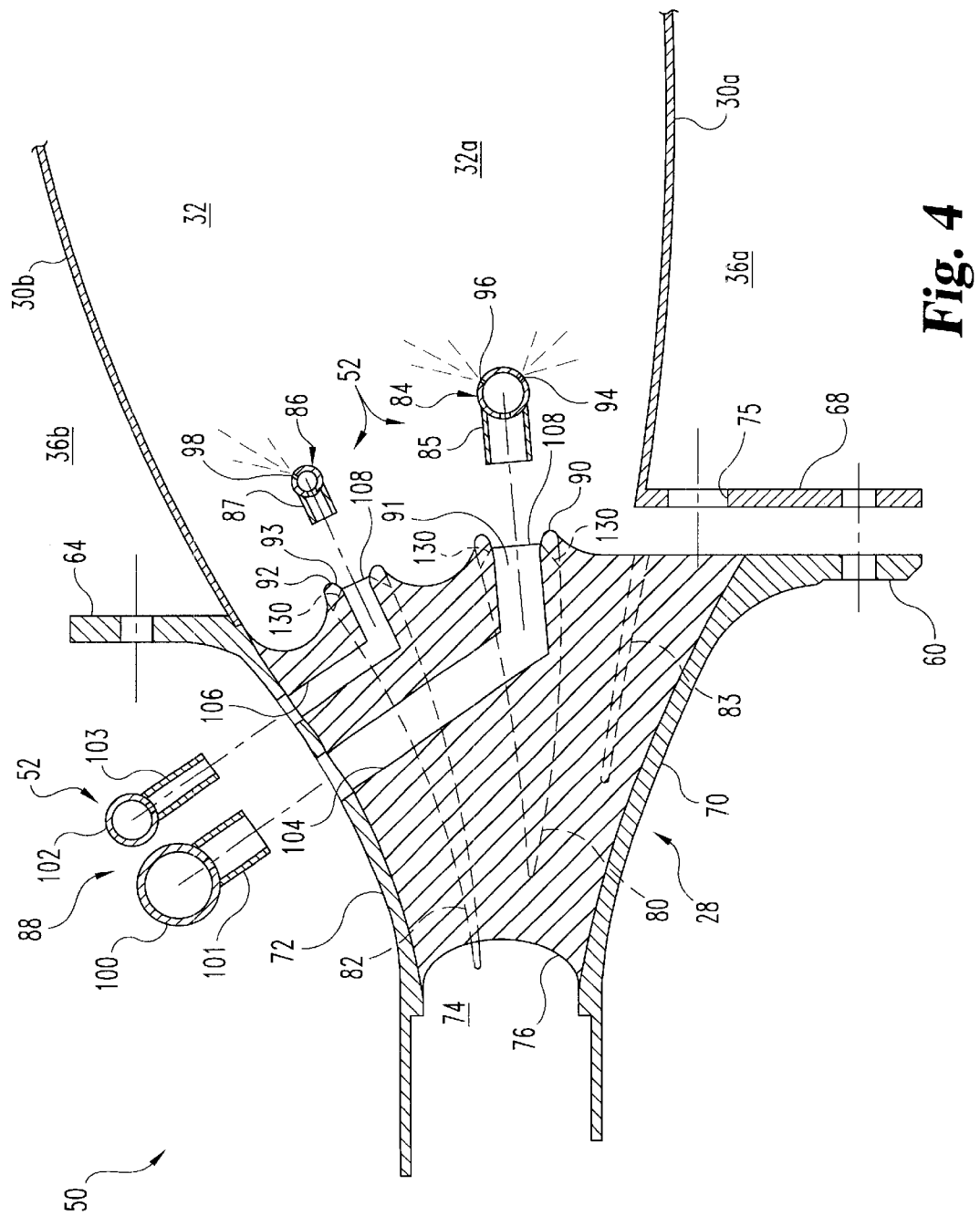
FIG. 4 is another sectional view of a portion of a gas turbine engine, illustrating a partially exploded cross-sectional view of the apparatus of FIG. 2 taken along line 4—4 of FIG. 3.

Referring to FIGS. 3 and 4, shown therein are further details regarding the fuel delivery system 52. In one embodiment, the inner spray ring 84 includes a first series of fuel delivery apertures 94 and a second series of fuel delivery apertures 96. In a further embodiment, each of the fuel delivery apertures 94 are positioned between adjacent ones of the fuel delivery apertures 96. The first series of fuel delivery apertures 94 is positioned about spray ring 84 generally along a first radius $R_1$ and arranged to spray fuel toward a location adjacent trailing edge 90, just downstream of the exit of flowpath pass 74c. The second series of fuel delivery apertures 96 is positioned about spray ring 84 generally along a second radius $R_2$ and arranged to spray fuel toward a location adjacent trailing edge 90, just downstream of the exit of flowpath pass 74b. The outer spray ring 86 includes a third series of fuel delivery apertures 98 positioned about spray ring 86 generally along a third radius $R_3$ and arranged to spray fuel toward a location adjacent a trailing edge 92, just downstream of the exit of flowpath pass 74a.

Although the fuel delivery system 52 has been illustrated and described as including inner and outer spray rings 84, 86, it should be understood that in other embodiments of the present invention any number of spray rings, including a single spray ring, could be used to introduce fuel into combustion chamber 32. Additionally, although spray rings 84, 86 are illustrated and described herein as having a generally tubular configuration and extending annularly about longitudinal axis L, it should be understood that other configurations are also contemplated as would occur to one of ordinary skill in the art. For example, spray rings 84, 86 do not have to extend continuously about diffuser 28, but could alternatively be comprised of a number of individual segments or spraybars arranged at various positions and orientations relative to diffuser 28. Spray rings 84, 86 may be formed of materials as would be known to one of ordinary skill in the art; material such as, but not limited to, materials available under the tradenames Inconel T18 and Haynes 230.

In one embodiment of fuel delivery system 52, the manifold system 88 is integrated with the diffuser 28 and is adapted to supply a quantity of fuel to each of the inner and outer spray rings 84, 86. Manifold system 88 generally comprises a pair of fuel delivery manifolds 100, 102 extending about diffuser 28, and a pair of fuel delivery passages 104, 106 in fluid communication with manifolds 100, 102, respectively. The fuel delivery passages 104, 106 are placed in fluid communication with spray rings 84, 86, respectively, to deliver fuel to the fuel delivery apertures 94, 96 and 98. In one form of the present invention, fuel delivery passages 104, 106 extend through each of the diffuser struts 76. However, it should be understood that fuel delivery passages 104, 106 could extend through any number of the struts 76, including a single strut 76, to supply fuel to the spray rings 84, 86.

In one embodiment, the fuel delivery manifolds 100, 102 are coupled to the outer diffuser wall 72 with the fuel delivery passages 104, 106 extending from the outer diffuser wall 72, through diffuser strut 76, and opening onto a trailing edge 108 of strut 76 (FIG. 4). The fuel delivery manifolds 100, 102 are placed in fluid communication with the delivery passages 104, 106 by a pair of fluid flow passage members 101, 103, respectively. The inner and outer spray rings 84, 86 are placed in fluid communication with the delivery passages 104, 106 by a pair of fluid flow passage members 85, 87. Fuel is provided to the fuel manifolds 100, 102 by a fuel source (not illustrated), directed through the fuel delivery passages 104, 106, delivered to the inner and outer spray rings 84, 86, and discharged into the combustion chamber 32 via the fuel delivery apertures 94, 96, 98.

As will be discussed more fully below, the fuel is intermixed with conditioned fluid exiting the diffuser 28 to form a combustion mixture. The combustion mixture is ignited by an igniter 110 (see FIG. 2) to generate a hot gaseous fluid stream within combustion chamber 32. In one embodiment, the igniter 110 extends through the outer combustion case 34b and is placed in communication with combustion chamber 32 via an opening extending through the outer combustion liner 30b.

Although the illustrated embodiment of manifold system 88 includes a pair of fuel delivery manifolds 100, 102, each adapted to independently supply fuel to spray rings 84, 86, respectively, it should be understood that a single manifold could alternatively be used to supply fuel to each of the spray rings. However, by providing a separate fuel delivery manifold for each spray ring, it is possible to divide the operation of combustor section 16 into two discrete areas of combustion, thus providing increased control over the burn pattern and/or flame location within combustion chamber 32. For example, by supplying a greater quantity of fuel to the inner spray ring 84 relative to the outer spray ring 86, the flame location may be concentrated toward the inner portion 32a of combustion chamber 32. Under certain operating conditions of engine 10, fuel may be supplied to the inner spray ring 84 alone, thereby further concentrating the flame location toward the inner portion 32a of combustion chamber 32. Since the outer liner 30b is typically subjected to relatively higher buckling loads than the inner liner 30a, concentrating the flame location toward inner liner 30a has the result of reducing the temperature of the outer liner 30b, thereby yielding a stronger outer liner 30b and increasing its buckling margin.

Referring collectively to FIGS. 3–6, in one form of the present invention, the inner and outer splitter vanes 80, 82 each include a plurality of vortex generators 120 located adjacent trailing edges 90, 92, respectively. One function of the vortex generators 120 is to swirl the conditioned fluid exiting the diffuser 28 as it is being introduced into the combustion chamber 32. More specifically, the vortex generators 120 are configured to generate vortices V (FIGS. 5 and 6), preferably at locations adjacent each of the fuel delivery apertures 94, 96, 98. The vortices V create a helical fluid flow to enhance the intermixing of fuel with the conditioned fluid exiting diffuser 28. Moreover, since the effective length of a helical air flowpath is shorter than the effective length of a linear air flowpath, the distance required to intermix the fuel with the conditioned fluid is reduced. As a result, the overall length of the combustion chamber 32 may be reduced, which correspondingly reduces the overall length and weight of the combustion liners 30a, 30b.

In one form of the present invention, the vortex generators 120 are comprised of a number of surface irregularities defined along the inner and outer flowpath surfaces 122, 124 of splitter vane 80 adjacent trailing edge 90, and along outer flowpath surface 126 of outer splitter vane 82 adjacent trailing edge 92. In one form of the invention, the surface irregularities are comprised of edges 131 extending from the flowpath surfaces 122, 124, 126. In one embodiment, the edges 131 are arranged generally parallel to the fluid flow. In another embodiment, the edges 131 are arranged generally perpendicular to the flowpath surfaces 122, 124, 126. It should be understood, however, that other configurations of edges 131 are also contemplated as would occur to one of ordinary skill in the art.

Figure 5:
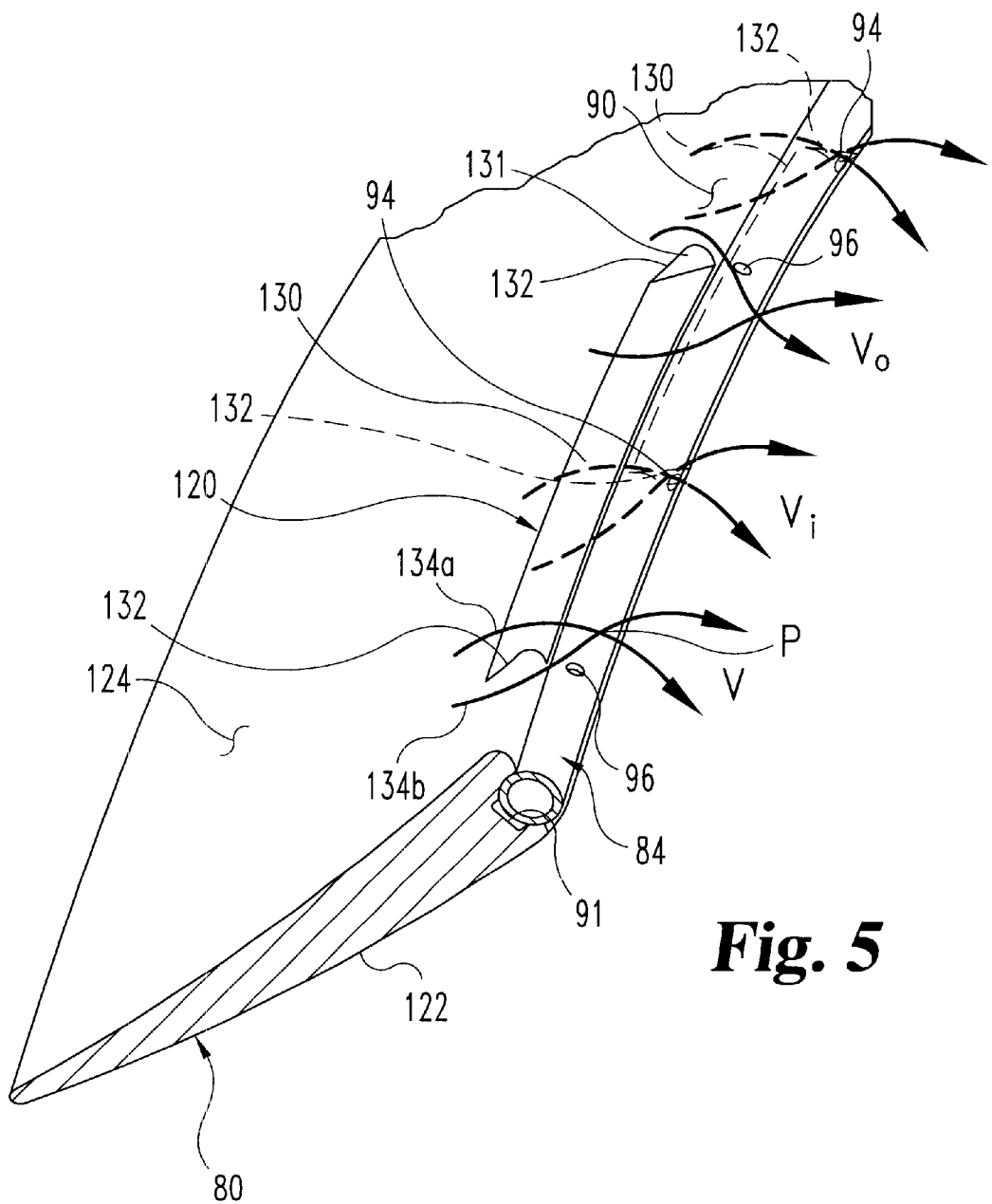
FIG. 5 is a partial perspective view of one form of an inner flow splitter and spray ring assembly for use with the apparatus of FIG. 2.
Figure 6:
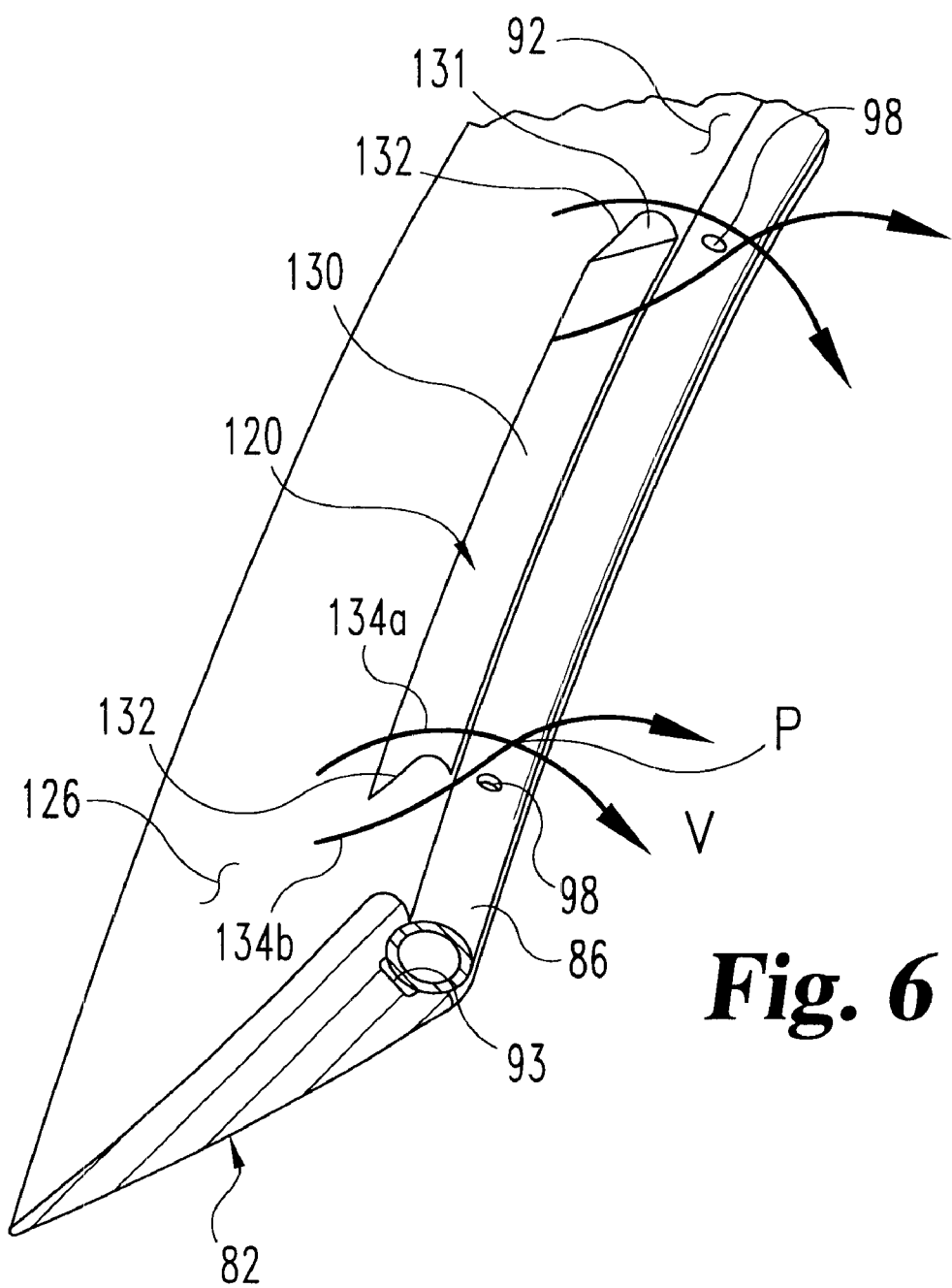
FIG. 6 is a side perspective view of one form of an outer flow splitter and spray ring assembly for use with the apparatus of FIG. 2.

In the illustrated embodiment, the surface irregularities are formed by recessed areas 130, created by the forming of the surface absent some quantity of material and/or removing material from the inner and outer splitter vanes 80, 82 adjacent trailing edges 90, 92, respectively. Preferably, the recessed areas 130 are intermittently positioned between adjacent pairs of fuel delivery apertures 94, 96, 98, thereby defining a corner 132 disposed adjacent each fuel delivery aperture. The conditioned fluid flowing across surfaces 122, 124 of inner splitter vane 80 and surface 126 of outer splitter vane 82 separates into two flowpaths 134a, 134b as the fluid rolls over the corners 132. The flowpaths 134a, 134b converge downstream of the corners 132 at a point of convergence P, and diverge downstream of point P to thereby generate a helical-shaped vortex V in the proximity of each fuel delivery aperture. The first series of fuel delivery apertures 94 in inner spray ring 84 are peripherally offset from the second series of fuel delivery apertures 96 to avoid interference between the inner vortices $V_i$ generated along the inner flowpath surface 122 and the outer vortices $V_o$ generated along the outer flowpath surface 124 (FIG. 5).

In an alternative form of the present invention, the surface irregularities may be configured as projections, created by localized regions of additional material on the inner and outer splitter vanes 80, 82 adjacent trailing edges 90, 92. Alternative configurations of the surface irregularities may be formed by other types of interruption in the contour of the inner and outer surfaces 122, 124 of splitter vane 80 and the outer surface 126 of splitter vane 82, such as would be apparent to one of ordinary skill in the art.

While the invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected. In reading the claims, it is intended that when words such as "a," "an," "at least one," "at least a portion," or "a portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus for forming a combustion mixture in a gas turbine engine, comprising:

a diffuser including first and second flowpath surfaces spaced apart to define a flowpath for directing fluid flow, at least one of said first and second flowpath surfaces including a surface irregularity adapted to generate a vortex upon the fluid flow passing thereover; and a fuel delivery member adapted to introduce fuel into the fluid flow adjacent the vortex to form the combustion mixture.

2. The apparatus of claim 1, wherein said surface irregularity is comprised of an edge formed on said at least one of said first and second flowpath surfaces.

3. The apparatus of claim 2, wherein said edge is formed by a localized relief of material from said at least one of said first and second flowpath surfaces.

4. The apparatus of claim 2, wherein said edge is formed by a localized protuberance of material on said at least one of said first and second flowpath surfaces.

5. The apparatus of claim 4, wherein said localized protuberance does not extend substantially into said flowpath.

6. The apparatus of claim 2, wherein said edge is generally parallel to the direction of fluid flow.

7. The apparatus of claim 6, wherein said edge is arranged generally perpendicular to said at least one of said first and second flowpath surfaces.

8. The apparatus of claim 3, wherein said edge and said at least one of said first and second flowpath surfaces define a corner, and wherein the vortex is generated as the fluid flow moves over said corner.

9. The apparatus of claim 1, wherein said first and second flowpath surfaces include a leading edge and a trailing edge, and said surface irregularity is formed adjacent the trailing edge of said at least one of said first and second flowpath surfaces.

10. The apparatus of claim 1, wherein said diffuser includes an inner flowpath wall member and an outer flowpath wall member that diverge away from one another in the direction of fluid flow, which further includes a splitter vane positioned between said inner flowpath wall member and said outer flowpath wall member, and wherein said at least one of said first and second flowpath surfaces having said surface irregularity is defined on said splitter vane.

11. The apparatus of claim 10, wherein said fuel delivery member is a fuel spraybar disposed adjacent a trailing edge of said splitter vane, said fuel spraybar being adapted to spray fuel into the vortex to form the combustion mixture.

12. The apparatus of claim 1, wherein said at least one of said first and second flowpath surfaces includes a plurality of said surface irregularities adapted to generate a vortex upon the fluid flow passing thereover, said fuel spraybar including a plurality of fuel delivery apertures adapted to spray fuel into a corresponding one of the vortices to form the combustion mixture.

13. An apparatus for forming a combustion mixture in a gas turbine engine, comprising:
a diffuser including first and second flowpath structures spaced apart to define a first flowpath for directing fluid flow; and
a first fuel spraybar disposed along a trailing edge of one of said first and second flowpath structures and adapted to spray fuel into the fluid flow exiting the first flowpath to form the combustion mixture.

14. The apparatus of claim 13, wherein said first fuel spraybar is positioned at a trailing end portion of said diffuser, and wherein said diffuser and said first fuel spraybar form an integral structure.

15. The apparatus of claim 13, wherein said trailing edge of said one of said first and second flowpath structures include a recess configured to receive said first fuel spraybar at least partially therein.

16. The apparatus of claim 13, wherein at least one of said first and second flowpath structures comprises a flow splitter vane.

17. The apparatus of claim 13, which further includes a strut extending between said first and second flowpath structures, said strut having a fuel delivery passage extending therethrough and disposed in fluid communication between a fuel source and said first fuel spraybar.

18. The apparatus of claim 13, wherein said first flowpath extends annularly about said diffuser, said first fuel spraybar comprising a first spray ring including a plurality of fuel delivery apertures spaced intermittently about a periphery of said first spray ring, said plurality of fuel delivery apertures adapted to spray fuel into the fluid flow exiting said first flowpath to form the combustion mixture.

19. The apparatus of claim 18, which further includes a plurality of struts extending between said first and second flowpath structures, at least one of said struts including a fuel delivery passage extending therethrough and disposed in fluid communication between a fuel source and said first spray ring.

20. The apparatus of claim 19, wherein said fuel source comprises a fuel supply manifold extending annularly about said diffuser, a plurality of said struts each including one of said fuel delivery passages disposed in fluid communication between said fuel supply manifold and said first spray ring.

21. The apparatus of claim 13, wherein said first fuel spraybar is disposed along a trailing edge of said first flowpath structure, said diffuser further including a third flowpath structure spaced from said first flowpath structure to define a second flowpath for directing fluid flow, said first fuel spraybar adapted to spray fuel into the fluid flow exiting each of said first and second flowpaths to form the combustion mixture.

22. The apparatus of claim 21, wherein said first fuel spraybar includes a first series of fuel delivery apertures adapted to spray fuel into the fluid flow exiting said first flowpath and a second series of fuel delivery apertures adapted to spray fuel into the fluid flow exiting said second flowpath, each aperture of said first series of apertures being disposed between adjacent apertures of said second series of apertures.

23. The apparatus of claim 22, wherein said first and second flowpaths extend annularly about said diffuser and wherein said first fuel spraybar is a spray ring, said first series of fuel delivery apertures disposed along a first radius of said spray ring and said second series of fuel delivery apertures disposed along a second radius of said spray ring.

24. The apparatus of claim 13, wherein said first fuel spraybar is disposed along a trailing edge of said first flowpath structure, said diffuser further including a third flowpath structure spaced from said second flowpath structure to define a second flowpath for directing fluid flow, a second fuel spraybar being disposed along a trailing edge of said second flowpath structure and adapted to spray fuel into the fluid flow exiting said second flowpath to form the combustion mixture.

25. The apparatus of claim 24, further comprising a first fuel source for supplying a first quantity of fuel to said first fuel spraybar, and a second fuel source for supplying a second quantity of fuel to said second fuel spraybar, said first fuel source being independent from said second fuel source.

26. The apparatus of claim 25, wherein said first fuel source and said second fuel source receive fuel from a common fuel supply.

27. The apparatus of claim 13, wherein said one of said first and second flowpath structures includes a flowpath surface having a surface irregularity adapted to generate a vortex as the fluid flow moves across the surface irregularity, said fuel spraybar adapted to spray fuel into the vortex to form the combustion mixture.

28. The apparatus of claim 27, wherein said surface irregularity is formed by an edge on said flowpath surface and arranged generally parallel to the fluid flow.

29. The apparatus of claim 13, further comprising inner and outer combustor liners spaced apart to define a combustion chamber therebetween, said inner and outer combustor liners each including upstream end portions directly coupled to said diffuser.

30. The apparatus of claim 29, wherein at least one of said inner and outer combustor liners is integrally attached to said diffuser to form an integral structure.

31. An apparatus for forming a combustion mixture in a gas turbine engine, comprising:

a diffuser including first and second structures spaced apart to define a flowpath for directing fluid flow, at least one of said first and second structures including a flowpath surface having an edge extending from said flowpath surface and arranged generally parallel to the fluid flow, wherein a vortex is generated as the fluid flow rolls over said edge; and a spraybar disposed along a trailing edge of said at least one of said first and second structures, said spraybar adapted to spray fuel into the vortex to form the combustion mixture.

32. The apparatus of claim 31, wherein said flowpath surface extends annularly about said diffuser with a plurality of said edges extending from said flowpath surface, said plurality of edges adapted to generate a corresponding plurality of vortices as the fluid flow rolls over said plurality of edges, said spraybar comprising a spray ring having a plurality of fuel delivery apertures positioned adjacent respective ones of said plurality of edges, said plurality of fuel delivery apertures adapted to spray fuel into respective ones of the plurality of vortices to form the combustion mixture.

33. The apparatus of claim 31, wherein said spraybar is attached to a trailing end portion of said diffuser to form an integral structure.

34. An apparatus for forming a combustion mixture in a gas turbine engine, comprising:

a diffuser including first and second flowpath surfaces spaced apart to define a flowpath for directing fluid flow, at least one of said first and second flowpath surfaces including surface means for generating a vortex in the fluid flow; and means for introducing fuel into said fluid flow adjacent the vortex to form the combustion mixture.

35. The apparatus of claim 34, wherein said diffuser and said means for introducing fuel are combined to form an integral structure for forming the combustion mixture.

* * * * *